(12) United States Patent
Ringe

(10) Patent No.: US 12,145,496 B2
(45) Date of Patent: Nov. 19, 2024

(54) LUMBER SUPPLY THEFT DETERRENT DEVICE

(71) Applicant: Donald Ringe, Garland, TX (US)

(72) Inventor: Donald Ringe, Garland, TX (US)

( * ) Notice: Subject to any disclaimer, the term of this patent is extended or adjusted under 35 U.S.C. 154(b) by 306 days.

(21) Appl. No.: 17/572,795

(22) Filed: Jan. 11, 2022

(65) Prior Publication Data

US 2023/0219481 A1   Jul. 13, 2023

(51) Int. Cl.
  *E05B 73/00* (2006.01)
  *B60P 7/08* (2006.01)

(52) U.S. Cl.
  CPC ......... *B60P 7/0823* (2013.01); *B60P 7/0892* (2013.01); *E05B 73/0005* (2013.01)

(58) Field of Classification Search
  CPC .. B60P 7/0823; B60P 7/0892; E05B 73/0005; Y10T 24/1406; Y10T 24/1408; Y10T 24/1412; Y10T 24/1435; Y10T 24/1469; Y10T 24/1457; Y10T 24/1459; Y10T 24/1486; Y10T 24/3967; Y10T 24/45079; Y10T 24/45147; Y10T 70/40; Y10T 70/411
  USPC .............................. 70/14, 18, 19, 57, 30, 49
  See application file for complete search history.

(56) References Cited

U.S. PATENT DOCUMENTS

| | | | |
|---|---|---|---|
| 3,945,227 A * | 3/1976 | Reiland ............... | E05B 73/0082 70/DIG. 57 |
| 4,052,867 A * | 10/1977 | Faunce ............... | B60R 11/0205 70/DIG. 57 |
| 4,502,619 A * | 3/1985 | Cox ........................ | B60P 7/15 410/127 |
| 4,860,408 A * | 8/1989 | Johnson ................ | D07B 5/005 24/122.3 |
| 5,177,986 A * | 1/1993 | Jensen ................ | A63C 11/021 70/58 |
| 5,217,208 A | 6/1993 | Stephenson | |
| 5,987,936 A * | 11/1999 | Hartman, Jr. .......... | E05B 73/00 70/164 |
| 6,044,525 A * | 4/2000 | Sastre ................ | B65D 63/1018 24/17 AP |
| 6,199,412 B1 | 3/2001 | Kennedy | |
| 6,280,128 B1 | 8/2001 | Schrader | |

(Continued)

FOREIGN PATENT DOCUMENTS

GB   2569092 A  *  6/2019  ............. B62H 5/003

*Primary Examiner* — Suzanne L Barrett

(57) ABSTRACT

An article of manufacture for providing a lumber supply theft deterrent device according to the present invention is a lumber supply theft deterrent device having a plurality of strap elements coupled together forming a securing loop, a locking coupling device connecting two of the strap elements together to form a tight fit about the lumber by the securing loop, and a locking device for securing the locking coupling device from being opened. The plurality of strap elements being coupled together using one or more coupling devices, the securing loop may be places around a stack of lumber. The securing loop is arranged into a shape of square or a rectangle in which the plurality of strap elements couple together to form the outer edge of the square when around the stack of lumber. A threaded bolt in the locking connecting device accepts a shackle from the lock for securing the lock to the treaded bolt. The shackle is configured to prevent the treaded bolt from rotating when the lock is installed in the threaded bolt.

9 Claims, 7 Drawing Sheets

(56) References Cited

U.S. PATENT DOCUMENTS

| | | | |
|---|---|---|---|
| 6,546,604 B2* | 4/2003 | Galkiewicz | A44B 18/0092 |
| | | | 24/584.1 |
| 6,752,575 B1* | 6/2004 | Moore | B60P 7/135 |
| | | | 410/94 |
| 8,002,232 B2* | 8/2011 | Meislahn | E05B 73/0005 |
| | | | 248/58 |
| 8,029,218 B2 | 10/2011 | Wiebe | |
| 8,356,720 B2* | 1/2013 | Mathews | A47B 45/00 |
| | | | 211/113 |
| 2002/0138952 A1 | 10/2002 | Wiebe | |
| 2003/0164009 A1* | 9/2003 | Levi | E05B 67/003 |
| | | | 70/58 |
| 2011/0031293 A1* | 2/2011 | Weber | E05B 67/383 |
| | | | 224/555 |
| 2021/0054665 A1* | 2/2021 | Allen | G06F 21/88 |

* cited by examiner

LUMBER SUPPLY THEFT DETERRENT DEVICE

TECHNICAL FIELD

This application relates in general to an article of manufacture for providing a theft prevention device, and more specifically, to an article of manufacture for providing a lumber supply theft deterrent device.

BACKGROUND

Construction sites typically include pallets and similar stacks of materials that have been delivered to the job site that may not be needed in their entirety until late within the construction process. These building materials include larger stacks of lumber of different sizes that ultimately will be cut down to size for use in the project. The stacks of lumber may be present at the job site for extended periods of time during which portions of the raw building materials are subject to theft. The cost associated with the loss of a portion of these building materials may become significant unless expensive theft prevention measures are taken, such as maintaining a physical presence of security guards and/or instituting visual electronic monitoring of the materials from a remote location. Elimination of the cost of a human observer while providing immediate detection of attempts to steal a portion of these building materials would reduce the costs associated with theft prevention while also reducing monitoring costs.

Therefore, a need exists for an article of manufacture for providing a lumber supply theft deterrent device. The present invention attempts to address the limitations and deficiencies in prior solutions according to the principles and example embodiments disclosed herein.

SUMMARY

In accordance with the present invention, the above and other problems are solved by providing an article of manufacture providing a lumber supply theft deterrent device according to the principles and example embodiments disclosed herein.

In one embodiment, the present invention is an article of manufacture for providing a lumber supply theft deterrent device. The lumber supply theft deterrent device having a plurality of strap elements coupled together forming a securing loop, a locking coupling device connecting two of the strap elements together to form a tight fit about the lumber by the securing loop, and a locking device for securing the locking coupling device from being opened.

In another aspect of the present invention, the plurality of strap elements being coupled together using one or more coupling devices, the securing loop may be places around a stack of lumber.

In another aspect of the present invention, the securing loop is arranged into a shape of square or a rectangle in which the plurality of strap elements couple together to form the outer edge of the square when around the stack of lumber.

In another aspect of the present invention, the securing loop is arranged into a shape of square or a rectangle in which the plurality of strap elements couple together to form the outer edge of the rectangle when around the stack of lumber.

In another aspect of the present invention, the plurality of strap elements are configured to have adjustable lengths when coupled together to form the outer edge of the rectangle around the stack of lumber.

In another aspect of the present invention, a first coupling device uses plurality of male teeth in a first strap element that are coupled within a plurality of mating holes within a second strap elements, the plurality of male teeth engage an equal number of the plurality of mating holes to secure the first and second strap element together when the securing loop is tight about the stack of lumber.

In another aspect of the present invention, the number of mating holes is greater than the number of male teeth such that the plurality of male teeth engage a subset of consecutive set of mating holes.

In another aspect of the present invention, a location of the subset of consecutive set of mating holes used to engage the plurality of male teeth adjusts the length of the securing loop.

In another aspect of the present invention, the locking coupling device comprises a threaded bolt and a square connecting tab on each end of a pair of strap elements, the threaded bolt engages a threaded hole within each of the square connecting tabs to couple the pair of strap elements together.

In another aspect of the present invention, a threaded bolt in the locking connecting device accepts a shackle from the lock for securing the lock to the treaded bolt. The shackle is configured to prevent the treaded bolt from rotating when the lock is installed in the threaded bolt.

In another aspect of the present invention, the treaded bolt is positioned with the square tabs causing the strap element adjacent to the square tabs, the treaded bolt has a locking hole to accept the shackle of the lock in which the shackle cannot pass between the treaded bolt and the strap element preventing the treaded bolt from rotating.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
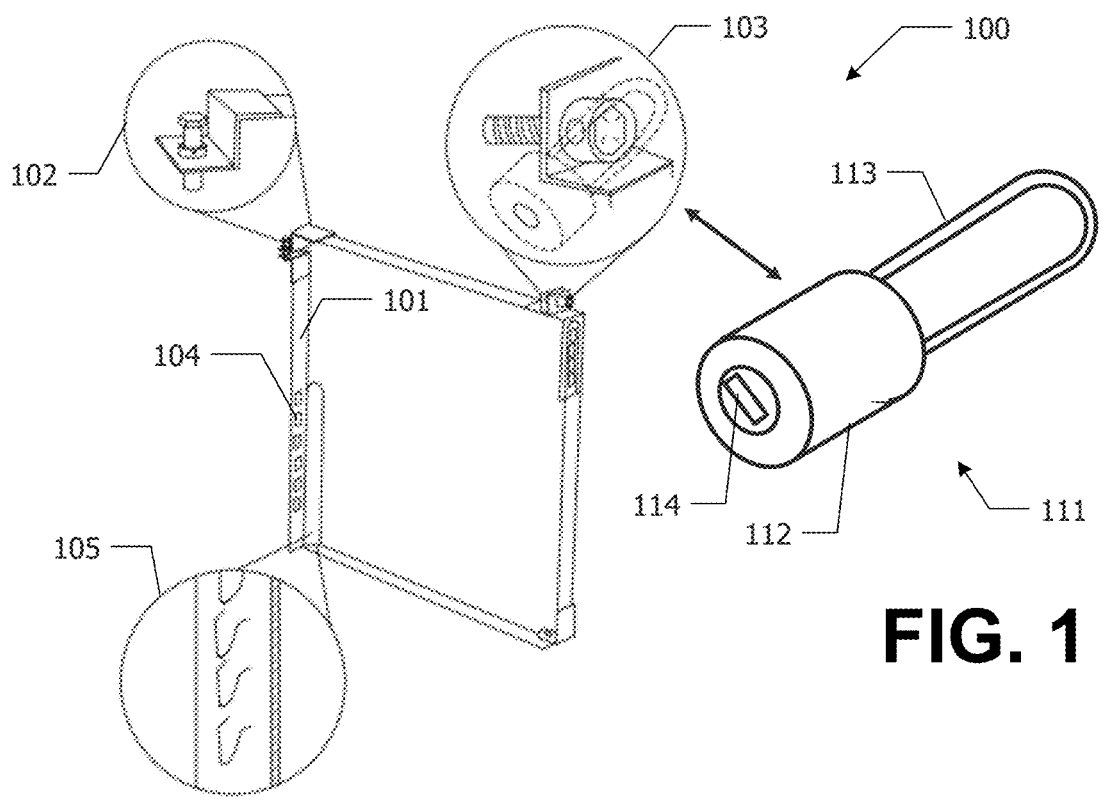
FIG. 1 illustrates an example embodiment of an article of manufacture providing a lumber supply theft deterrent device according to the present invention.

This application relates in general to an article of manufacture for providing a theft prevention device, and more specifically, to an article of manufacture providing a lumber supply theft deterrent device according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using an article of manufacture providing a lumber supply theft deterrent device according to the present invention. The term user herein refers to one or more users.

The term "invention" or "present invention" refers to the invention being applied for via the patent application with the title "Lumber Supply Theft Deterrent Device." Invention may be used interchangeably with theft deterrent device.

Figure 2:
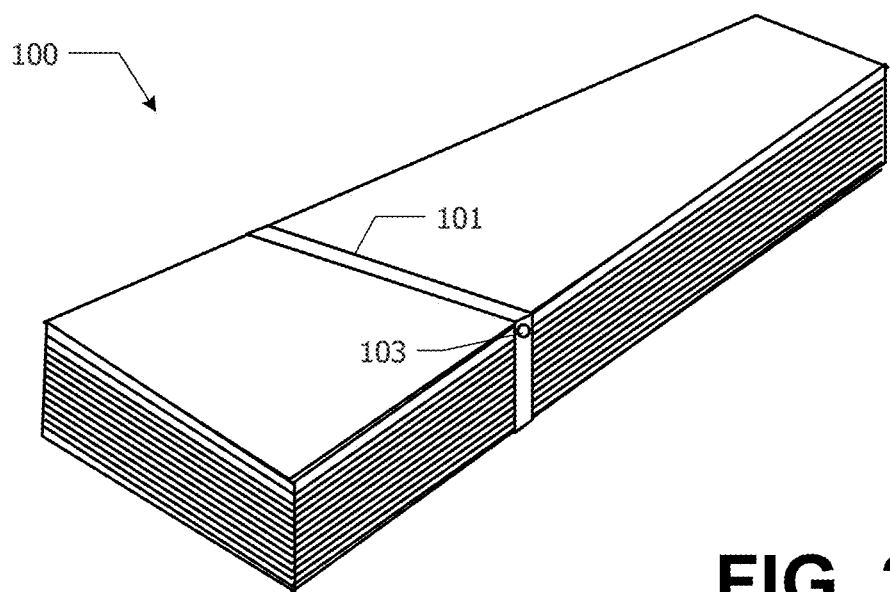
FIG. 2 illustrates an article of manufacture providing a lumber supply theft deterrent device used with a lumber stack according to the present invention.

In general, the present disclosure relates an article of manufacture providing a lumber supply theft deterrent device according to the present invention. To better understand the present invention, FIG. 1 illustrates an example embodiment of an article of manufacture providing a lumber supply theft deterrent device according to the present invention. The lumber supply theft deterrent device, known herein as a lumber supply theft deterrent device 100, may be installed around a stack of lumber 200, as seen in FIG. 2, that prevents individual boards from being easily removed without detection. The lumber supply theft deterrent device 100 comprises a set of strap elements 101 that are coupled together forming a securing loop using one or more connecting devices 102-105 that permit the length of the strap elements to be adjusted to provide a tight and secure installation around the stack of lumber 200. These one or more connecting devices 102-105 are routinely adjusted to maintain a tight fit around the stack of lumber 200 as its size changes when boards are removed for installation into the building project.

At least one of the of the connecting devices 102-105 includes the use of a lock 111 having a lock body 112 and a lock shackle 113 that engages one of the connecting straps 103 to prevent the removal of the lumber supply theft deterrent device 100. The lock 111 also may include a keyhole 114 for accepting a key (not shown) to permit the removal of the lumber supply theft deterrent device 100 by authorized individuals to obtain lumber when needed. The lock 111 also may utilize other lock technologies including combination locking mechanisms, biometric locking mechanisms, and other known locking mechanisms in place of a key-based lock tumbler mechanism.

A square design of the lumber supply theft deterrent device 100 does not allow it to be used over uneven stacks of material as in FIG. 2. The most widely stolen material is OSB and Subfloor. Seldomly lumber boards are stolen. These OSB and subfloor items are delivered in a square stack and remain that way through use. Lumber boards, as shown in FIG. 2, may also be protected as long as the stack of lumber remains in a square or rectangular shape as typically found in stacks of plywood and subflooring.

Figure 3:
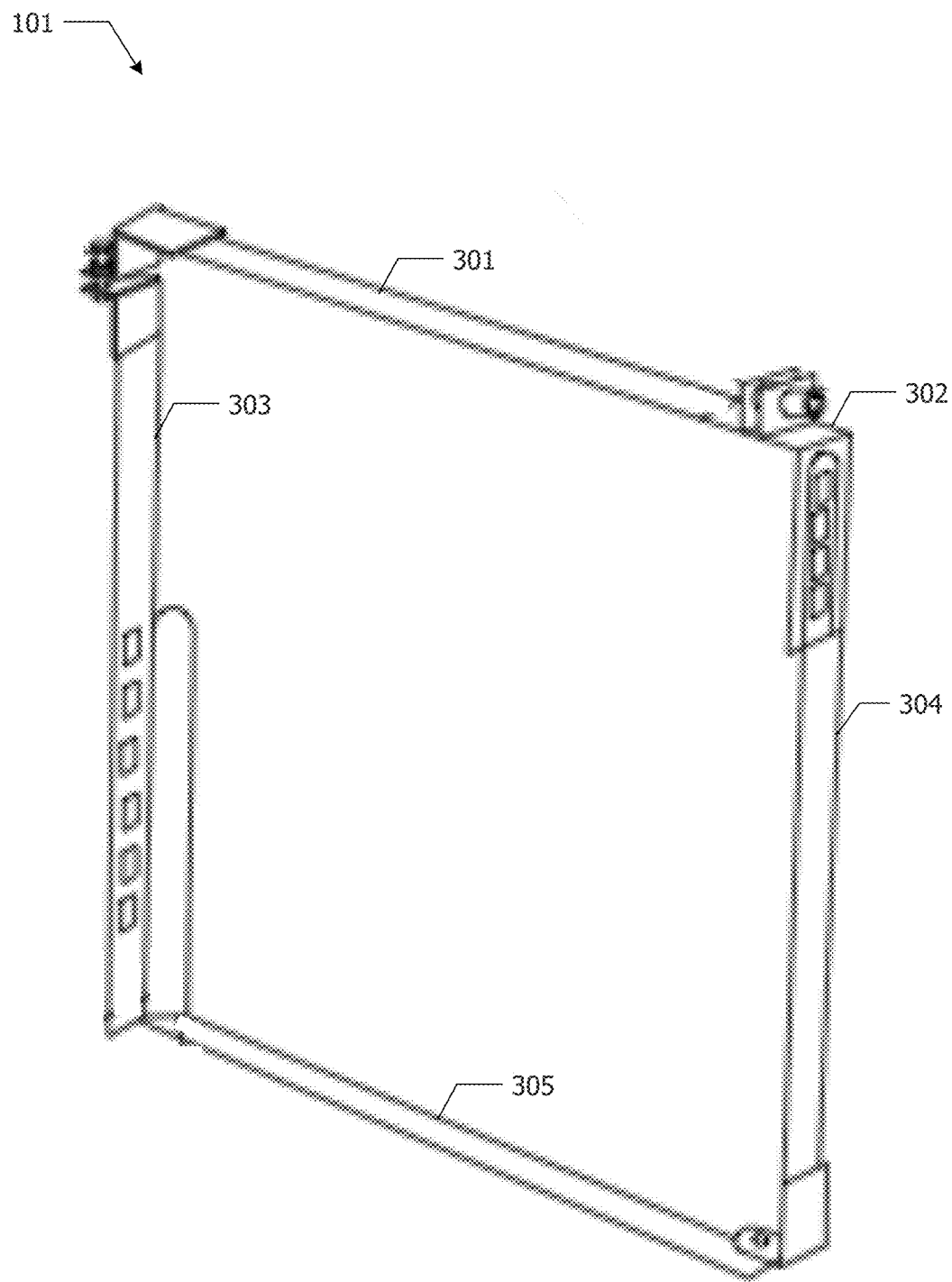
FIG. 3 illustrates a first embodiment of an article of manufacture providing a lumber supply theft deterrent device according to the present invention.

FIG. 3 illustrates a first embodiment of an article of manufacture providing a lumber supply theft deterrent device according to the present invention. One embodiment of the lumber supply theft deterrent device 100 is shown having a first connecting strap 301 across a top, a connecting second strap 302 along one side, a connecting third strap 303 along a second side, and a connecting fourth strap 304 across a bottom side. These connecting straps 301-304 are connected together as shown in FIG. 3 once placed around a stack of lumber 200 as shown in FIG. 2.

Each of the connecting straps 301-304 is coupled together using locking connectors 311-312, length adjusting connectors 313-314 and fixed connectors 315. These connectors 311-314 typically are about the corners of the lumber supply theft deterrent device 100. Each of the connecting straps 301-304 may be provided having multiple lengths that may be substituted into the lumber supply theft deterrent device 100 as needed to maintain a tight and secure fit around the stack of lumber 200. For example, as the height of the stack of lumber 200 drops during construction, the second strap 302 and the third strap 303 may be replaced with replacement straps having shorter lengths as needed. The replacement straps possess identical adjusting connectors 313-314 as needed to fine-tune the size of the lumber supply theft deterrent device 100 to match the circumference of the stack of lumber 200.

Figure 4:
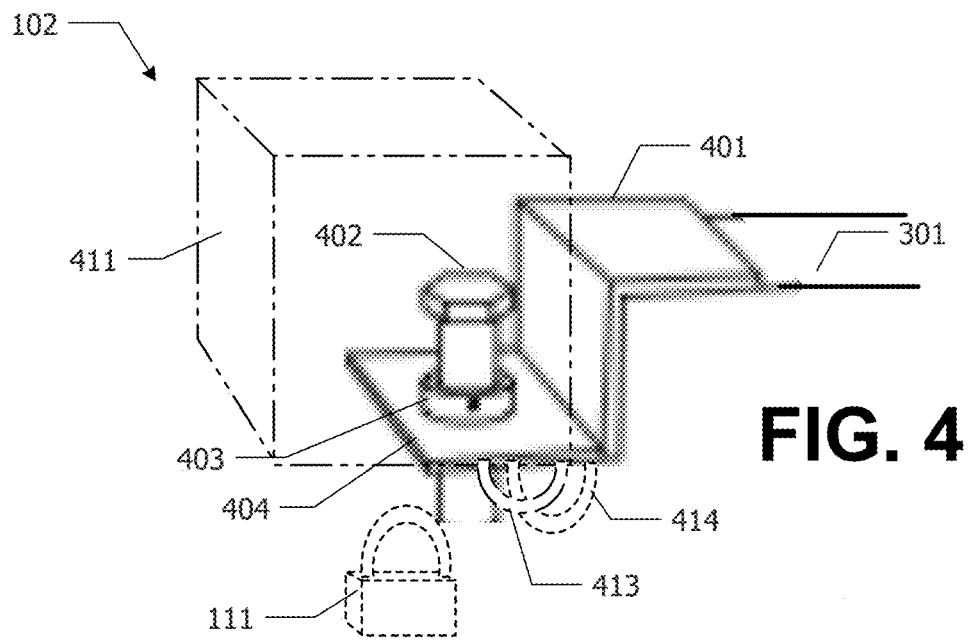
FIG. 4 illustrates a first connection of segments of an article of manufacture providing a lumber supply theft deterrent device according to the present invention.
Figure 6:
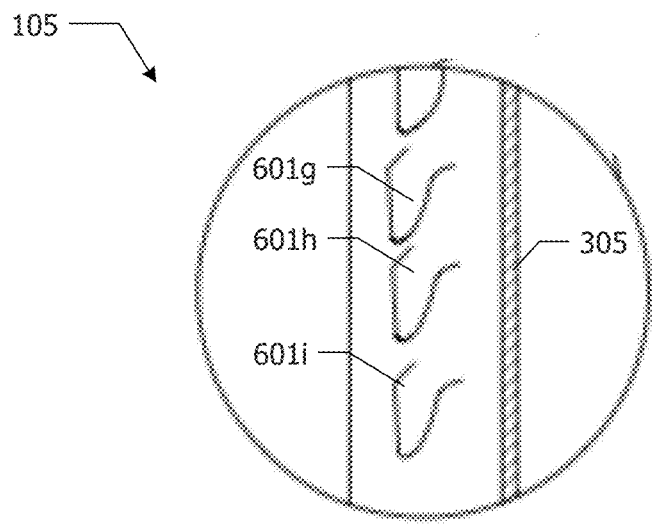
FIG. 6 illustrates an example of the plurality of identical male teeth 601*a-n* used in a third connection of segments of an article of manufacture providing a lumber supply theft deterrent device according to the present invention.
Figure 7:
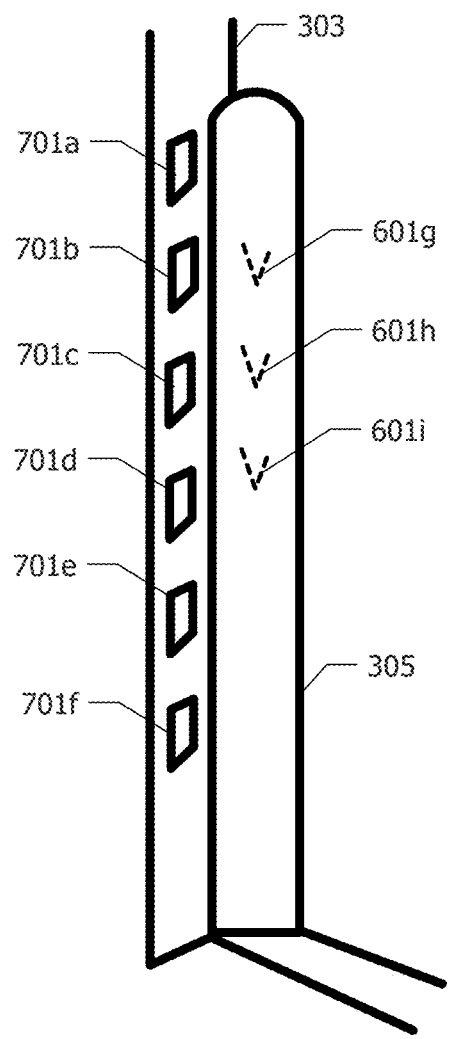
FIG. 7 illustrates an example of the plurality of mating holes 701*a-e* of a fourth connection of segments of an article of manufacture providing a lumber supply theft deterrent device according to the present invention.

The locking connectors 311-312 are shown in detail in FIGS. 3-4, having a removable coupling device such as a threaded bolt and a locking mechanism that prevents the unauthorized removal of the removable coupling device. In contrast, the adjusting connectors 313-314 have a plurality of identical male teeth 601a-n and a plurality of mating holes 701a-e that attach together 701a-e as shown in FIGS. 6-7. The male teeth 601a-n may be positioned at different positions within the plurality of mating holes 701a-e to adjust the effective length of the connecting strap 302-303. The fixed connector 315 provides a non-adjustable coupling device to connect two connecting straps together. The fixed connector 315 may be a keyhole configured to accept a coupling peg that is held in place when the lumber supply theft deterrent device 100 is securely in place around the stack of lumber 200.

FIG. 4 illustrates a first connection of segments of an article of manufacture providing a lumber supply theft deterrent device according to the present invention. A first locking connector 102 connects the first connecting strap 301 to the second connecting strap 302 using a threaded bolt 402. The threaded bolt 402 passes through a hole 403 through a connecting tab 404 to engage a threaded mating hole (not shown) in an end tab (not shown) on an upper end of a second connecting strap 302. The connecting tab 404 is coupled to a top tab 401 that is physically attached to the first connecting strap 301. The threaded bolt 404 tightens until the end tab of the upper end of the second connecting strap 302 is securely held against the connecting tab 404. When coupled together, the threaded bolt 402, the connecting tab 404, and the end tab on the upper end of the second connecting strap form the locking connector 102 between the first connecting strap 301 and the second connecting strap 302.

A locking enclosure 401 is placed over the connecting tab 404 and the threaded bolt 402 to prevent the removal of the threaded bolt 402 when the lumber supply theft deterrent device 100 is in place. The locking enclosure 401 uses an attached enclosure eyehook 413 to permit the lock 111 to secure the locking enclosure 401 in place. The connecting tab 404 also uses an attached tab eyehook 414 to enable the lock 111 shackle 113 to pass through both eyehooks 413-414 preventing the removal of the locking enclosure 401. A user may access the threaded bolt 402 to unhook the lumber supply theft deterrent device 100 from the stack of lumber 200 by removing the lock 111 and lifting the locking enclosure 401 from the first locking connector 102.

Figure 5:
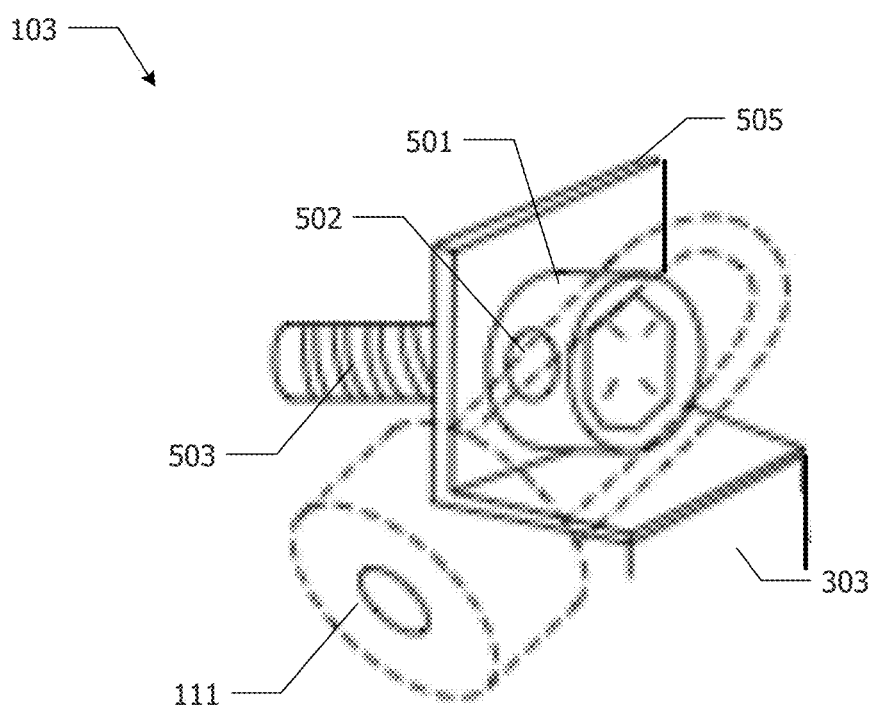
FIG. 5 illustrates a second connection of segments of an article of manufacture providing a lumber supply theft deterrent device according to the present invention.

FIG. 5 illustrates a second connection of segments of an article of manufacture providing a lumber supply theft deterrent device according to the present invention. A second embodiment of the second locking connector 103 is shown in FIG. 3 to connect the third connecting strap 303 to the first connecting strap 301. The second locking connector 103 comprises a square connecting tab 505 coupled to the end of the second connecting strap 303, a through hole (not shown) in the connecting tab 505, and a threaded bolt 503. The threaded bolt 503 is inserted into the through hole in the square connecting tab 505 allowing a threaded bolt 503 to engage the threaded tab (not shown) attached to the one end of the first connecting strap 301. The threaded bolt 503 couples the square connecting tab 505 and a square threaded tab on the first connecting strap 301 together in the same manner as disclosed above in reference to FIG. 4. In this embodiment of the second locking connector 103, the lock 111 secures the threaded bolt 503 in place using a threaded hole 502 through a head of the threaded bolt 503.

The shackle 113 of the lock 111 may be inserted through the threaded hole 502 to prevent the threaded bolt 503 from being removed. If the through hole in the square connecting tab 505 is positioned such that the head of the threaded bolt 503 is adjacent to the coupled surface 506 of the square connecting tab 505 attached to the third connecting strap 303, the shackle 113 of the lock 111 will prevent the threaded bolt 503 from rotating as long as the lock 111 is in place. So long as the space between the head of the threaded bolt 503 and the coupled surface 506 is smaller than the thickness of the shackle 113, the threaded bolt 503 will not rotate. An eyehook (not shown) also may be added to the connecting tab 505 and configured to permit the shackle 113 to pass through both the eyehook and the through hole in the connecting tab 505 to provide additional security to prevent the threaded bolt 503 from rotating.

FIG. 6 illustrates an example of the plurality of identical male teeth 601a-n used in a third connection of segments of an article of manufacture providing a lumber supply theft deterrent device according to the present invention. FIG. 7 illustrates an example of the plurality of mating holes 701a-f of a fourth connection of segments of an article of manufacture providing a lumber supply theft deterrent device according to the present invention. As noted above in reference to FIG. 3, the plurality of identical male teeth 601a-n engages the plurality of mating holes 701a-f to couple the second connecting strap 302 of FIG. 3 to the further connecting strap 304.

The plurality of male teeth 601g-i is inserted into an identical number of the plurality of mating holes 701a-e and positioned such that the plurality of male teeth 601g-i engages the surface of the second connecting strap 302. The locking connectors 102-103 are then engaged to complete the lumber supply theft deterrent device 100 which prevents the movement of the second connecting strap 302 relative to the position of the corresponding fourth connecting strap 304 that have been coupled together.

As shown in FIG. 7, the plurality of male teeth 601g-i is positioned on an outer side of the fourth connecting strap 304 permitting them to pass through a number of the plurality of mating holes 701a-f. The plurality of male teeth 601g-i may be inserted into various sets of the plurality of mating holes 701a-f to adjust the circumference of the lumber supply theft deterrent device 100. For example, the plurality of male teeth 601g-i may be inserted into a top set 701a-c of the plurality of mating holes 701a-f. The plurality of male teeth 601g-i also may be inserted into a bottom set 701d-f of the plurality of mating holes 701a-f to lengthen the circumference of the lumber supply theft deterrent device 100. The plurality of male teeth 601g-i may be inserted into any of the other sets of the plurality of mating holes 701a-f to obtain a desired length between the top set 701a-c and the bottom set 701d-f. In addition, the plurality of mating holes 701a-f may comprise any number of mating holes to permit the length of the circumference of the lumber supply theft deterrent device 100 to be adjusted to any desired length.

The second adjusting connector 103 also uses a similar set of male teeth and mating holes while having a different number and spacing of the teeth and holes from the ones of FIGS. 6-7 to accomplish a similar connection. The second adjusting connector 103 may be used to aid in the completion of the lumber supply theft deterrent device 100 by allowing the other connectors 102-104 to be adjusted to a desired length before the second adjusting connector 103 is used to complete the lumber supply theft deterrent device 100.

Figure 8:
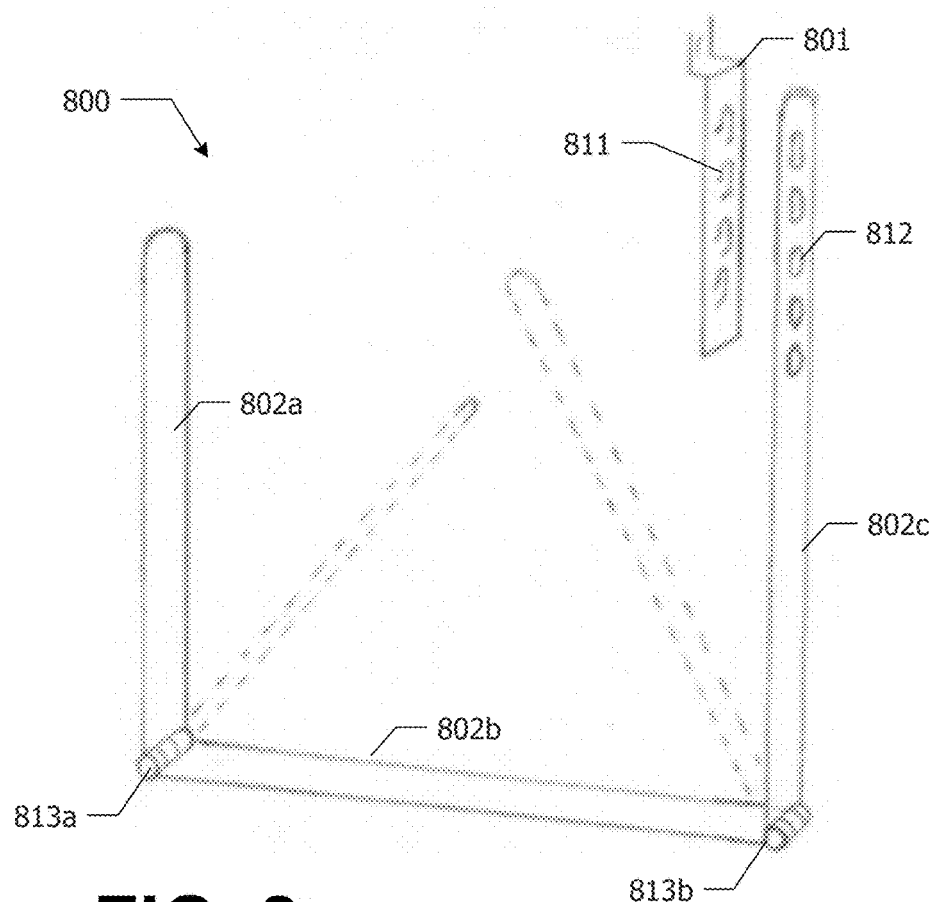
FIG. 8 illustrates a second embodiment of an article of manufacture providing a lumber supply theft deterrent device according to the present invention.

FIG. 8 illustrates a second embodiment of an article of manufacture providing a lumber supply theft deterrent device according to the present invention. The second embodiment 800 uses a pair of hinges 813a-b to couple together a first side connector strap 802a, a bottom connector strap 802b, and a second side connector strap 802c. This embodiment replaces the two side connecting straps 302-303 and bottom connecting strap 304 as disclosed in reference to FIG. 3. The hinges 813a-b may assist a user to configure the lumber supply theft deterrent device 100 by inserting the second embodiment 800 under the stack of lumber 200 (or through a pallet not shown on which the stack of lumber 200 is resting) before positioning the side connector straps 802a, c by pivoting the hinges 813a-b. This embodiment may assume that the stack of lumber 200 has a relatively fixed width that matches the length of the bottom connector strap 802b that may remain constant through the construction project. A top connecting strap (not shown) may be coupled to the side connector straps 802a, c using any of the connectors 102-104 disclosed above.

Figure 9:
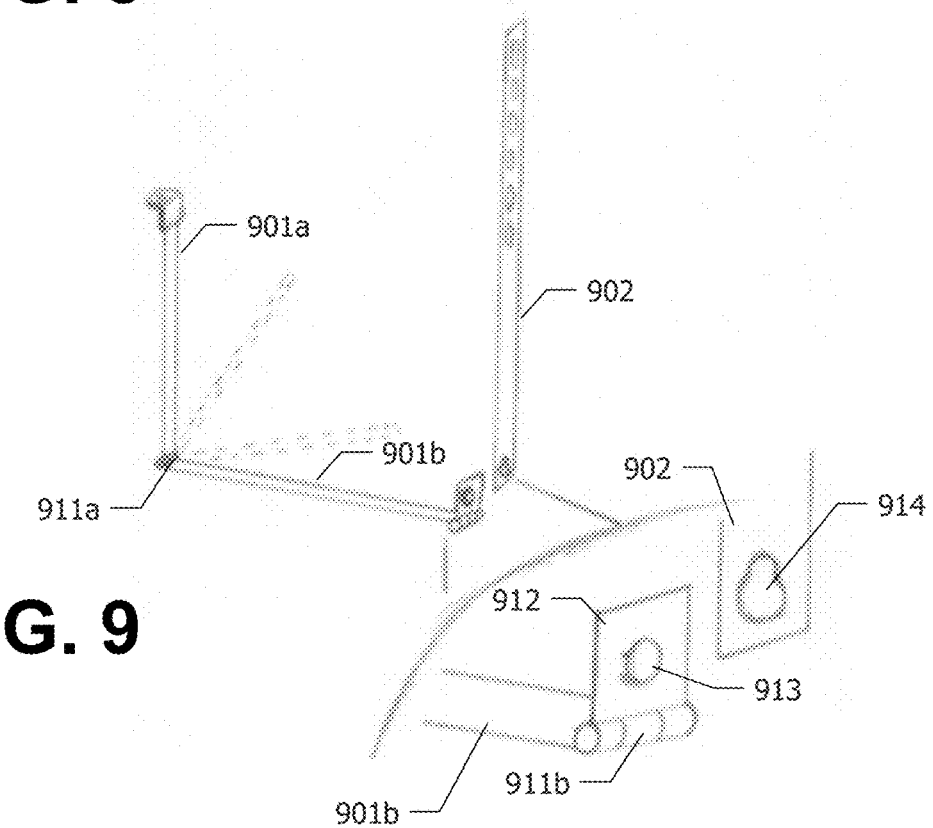
FIG. 9 illustrates a third embodiment of an article of manufacture providing a lumber supply theft deterrent device according to the present invention.

FIG. 9 illustrates a third embodiment of an article of manufacture providing a lumber supply theft deterrent device according to the present invention. In this third embodiment 900, a first side connecting strap 901a is coupled to a bottom connecting strap 901b by a hinge 911a. A fixed connector tab 912 is coupled to an opposite end of the bottom connecting strap 901b. A second side connecting strap 902 is then coupled to the fixed connector tab 912 to complete the three sides of the lumber supply theft deterrent device 100. Like the embodiment 800 of FIG. 8, the top connecting strap (not shown) may be coupled to the side connector straps 802a, c using any of the connectors 102-104 disclosed above.

As noted above in reference to FIG. 3, the fixed connector 900 comprises a keyhole 914 configured to accept a coupling peg 913 coupled to the fixed connecting tab 912 that is held in place when the lumber supply theft deterrent device 100 is securely in place around the stack of lumber 200. The fixed connecting tab 912 may be directly coupled to the bottom connecting strap 901b (not shown) or by a hinge 911b to complete the connector that couples the bottom connecting strap 901b to the second side connecting strap 902.

Figure 10A:
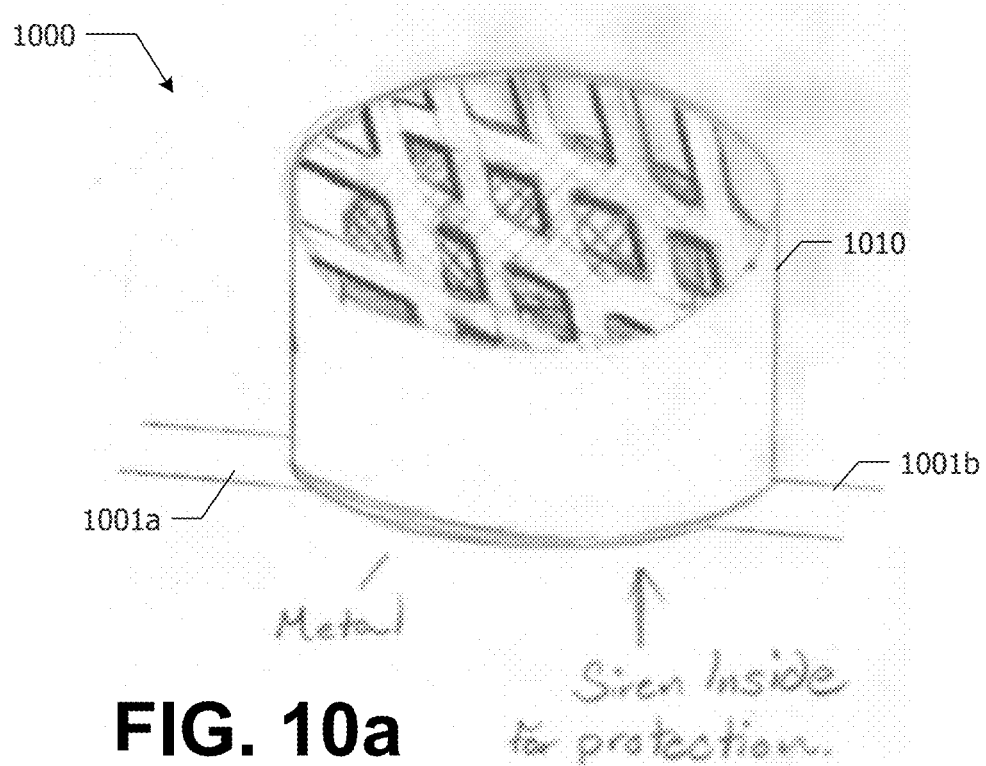
FIGS. 10*a-b* illustrate an alarm device used in an article of manufacture providing a lumber supply theft deterrent device according to the present invention.
Figure 10B:
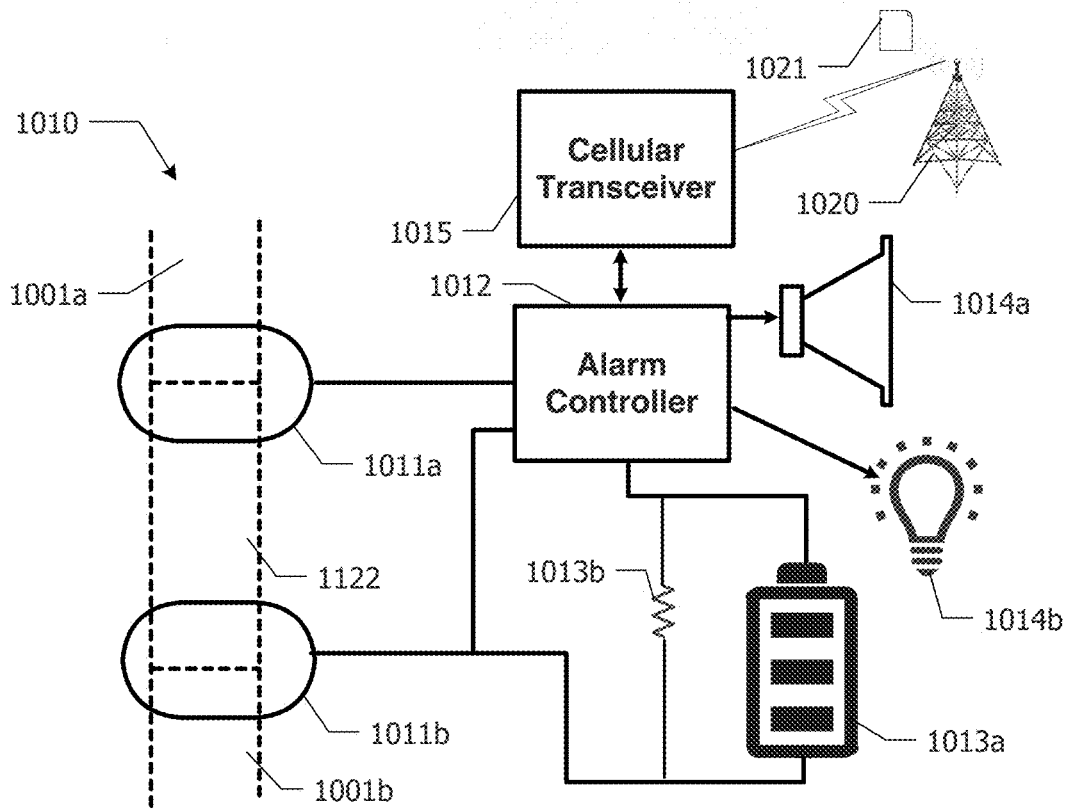

FIGS. 10a-b illustrate an alarm detection device used in an article of manufacture providing a lumber supply theft deterrent device according to the present invention. An alarm 1000, shown in FIG. 10a, may be added to the lumber supply theft deterrent device 100 to further deter theft of boards from the stack of lumber 200. An alarm device 1010 may be coupled to one of the connecting straps 301-304 to detect and provide an alert when the lumber supply theft deterrent device 100 is opened. The alarm device lumber supply theft deterrent device 100 may generate a visual alarm in the form of flashing lights, may generate an auditory alarm in the form of a siren or similar sound, and may generate an electronic message to a responsible individual when the alarm is triggered. The alarm device 1001 may include any or all of these alarms as desired.

FIG. 10b shows electronic components of the alarm device 1010 that may produce the various alarms disclosed herein. The electronic components 1011-1015 of the alarm device 1001 comprise a pair of electrical connections 1011a-b, an alarm controller 1012, a battery 1013a, a resistor 1013b, one or more local alarm generators 1014a-b, and a wireless transceiver 1015. The alarm device 1001 is electrically coupled to a connecting strap to detect the opening of the lumber supply theft deterrent device 100. The connecting straps typically are made of steel or similar electrical conducting metals. A small portion of a non-conducting connecting strap 1022 is inserted between two electrical conducting segments 1001a-b in one of the connecting straps of the lumber supply theft deterrent device 100. When in place, the lumber supply theft deterrent device 100 provides a continual electrically-coupled circuit line that should appear as a single wire. The electronic components 1011-1015 may measure the impedance of the sequence of connecting straps or may complete an electrical circuit by connecting the pair of electrical connections 1011a-b to each of the two electrical conducting segments 1001a-b. The alarm controller 1012 may detect when the sequence of connecting straps is in place and generate an alarm when opened. The insertion of the non-conducting connecting strap 1022 between the two electrical conducting segments 1001a-b ensures that the alarm device 1010 can detect when the two electrical conducting segments 1001a-b are part of a fully connected lumber supply theft deterrent device 100.

The pair of electrical connections 1011a-b is coupled to each of the two electrical conducting segments 1001a-b of a connecting strap. These electrical connections 1011a-b connect the set of connecting straps to the alarm device 1010. The pair of electrical connections 1011a-b is provided as inputs to the alarm controller 1012. The battery 1013a and a resistor 1013b are connected between the pair of electrical connections 1011a-b permitting the alarm controller to observe a voltage difference generated by the battery when the lumber supply theft deterrent device 100 is not fully connected. When the lumber supply theft deterrent device 100 is fully connected, the voltage difference between the pair of electrical connections 1011a-b will be minimal as the conducting connecting segments appear to the alarm controller 1012 as an electrical short.

The alarm controller 1012 performs the alarm detection of the opening of the lumber supply theft deterrent device 100, performs the setting and disabling of the alarm device 1010, performs the alarm message generation and transmission to a responsible entity, and enables and disables the one or more local alarm generators 1014a-b. The alarm controller 1012 may consist of a software-based control device, a custom micro-coded application specific device, and a state machine based logic circuit to implement its functions. The alarm controller 1012 communicates with a user to accept inputs associated with the operation of the alarm device 1010 and the various alarm messages. The user may provide input data as well as receive status and command confirmation using the wireless transceiver 1015 communicating with a remote device such as a smartphone or similar computing device. The wireless transceiver 2015 may use any supported communications protocols and communications channels to send and receive data between the smartphone and the alarm device 1010. The alarm device 1010 also may support input buttons and other input devices directly connected to the alarm device 1010.

The alarm controller 1012 provides a programming mechanism to permit a user to program operating parameters and alarm messages for use when the alarm device 1010 is activated. The alarm controller 1012 receives an input to at least enable and disable the alarm from operating when the lumber supply theft deterrent device 100 is not connected. A user communicates with the alarm device 1010 after the lumber supply theft deterrent device 100 is secured in place. A user also communicates with the alarm device 1010 before the lumber supply theft deterrent device 100 is removed to prevent the triggering of an alarm. The alarm controller is responsible for authenticating a user and authorizing particular operations as appropriate.

The alarm controller 1012 generates and transmits the alarm message via the wireless transceiver 1015. The alarm message 1021 may be in the form of an SMS message and/or email message that would require input of a recipient phone number and an email address, input of identification information related to the particular alarm device 1010 and/or its current location and input a body of any message to be sent. If the alarm controller 1012 is communicating with a device with a different message format, the alarm controller 1012 would require this message and its contents. If a userID and password was needed to communicate with a remote computing system, this data also may be input to the alarm controller 1012.

The alarm controller 1012 enables and disables the one or more local alarm generators 1014a-b in order to generate the visual and auditory alarms supported by the alarm device 1012. The one or more local alarm generators 1014a-b may be supported by a communications interface that activates and deactivates the alarm generator. For example, the alarm controller 1012 may communicate an activate command to turn an alarm light 1014b on and a deactivate command to turn the alarm light 1014b off. If the alarm light 1014b is to flash a light to visually alert nearby individuals of the active alarm, the alarm controller 1012 may periodically toggle the state of the alarm light 1014b at a desired frequency.

If the alarm light 1014b contains electronics to flash the alarm light at 1014b a particular frequency, the alarm controller 1012 may send a command to activate a flashing light and possibly an operating frequency for the flashes. The alarm controller 1012 would not need to generate an additional command to the alarm light 1014b until the alarm controller 1012 is deactivating the alarm light 1014b and/or changes the flash frequency of the alarm light 1014b. Similar command sequences may be generated by the alarm controller to the auditory alarm device 1014a as well.

The alarm controller 1012 also may periodically provide operating status of the alarm device 1010 to users regarding potential problems or maintenance needs of the alarm device 1010. For example, the alarm controller 1012 may communicate to a user the state of the battery 1013a when it is close to needing a new battery and/or a recharge of the battery to provide continuous detection of a theft attempt. The alarm controller 1012 may activate any or all of the alarms including flashing the alarm light 1014b, generating an auditory alarm 1014a, and transmitting a message using the wireless transceiver 1015. The characteristics and content of the flashing light, auditory alarm, and alarm message may be different for a low battery voltage indication than one used to alert a user to an authorized opening of the lumber supply theft deterrent device 100.

The battery 1013a provides a power source to permit all of the electrical components 1011-1015 to operate. The presence of the resistor 1013b between the pair of electrical connections 1011a-b as well as across the terminals of the battery 1013a causes an observed voltage on a second electrical connector 1001b to match the battery voltage while the observed voltage on the first electrical connector 100a matches the battery negative terminal.

The one or more local alarm generators 1014a-b are used to output a visual alarm using a light 1014b and an auditory alarm using a siren 1014a or similar sound generating device. The alarm controller 1012 activates these local alarm generators 1014a-b when a break in the lumber supply theft deterrent device 100 is detected.

The wireless transceiver 1015 provides the alarm device 1010 the ability to connect to a wireless network 1020 to transmit an alarm message to a responsible individual or entity indicating that an alarm has been triggered. The alarm message 1021 may be an SMS message sent over a cellular network to a mobile device of the responsible entity. The alarm message also may be a message over a WiFi network, a Bluetooth connection, or a similar wireless connection to a locally attached device that may communicate with the responsible entity.

Figure 11:
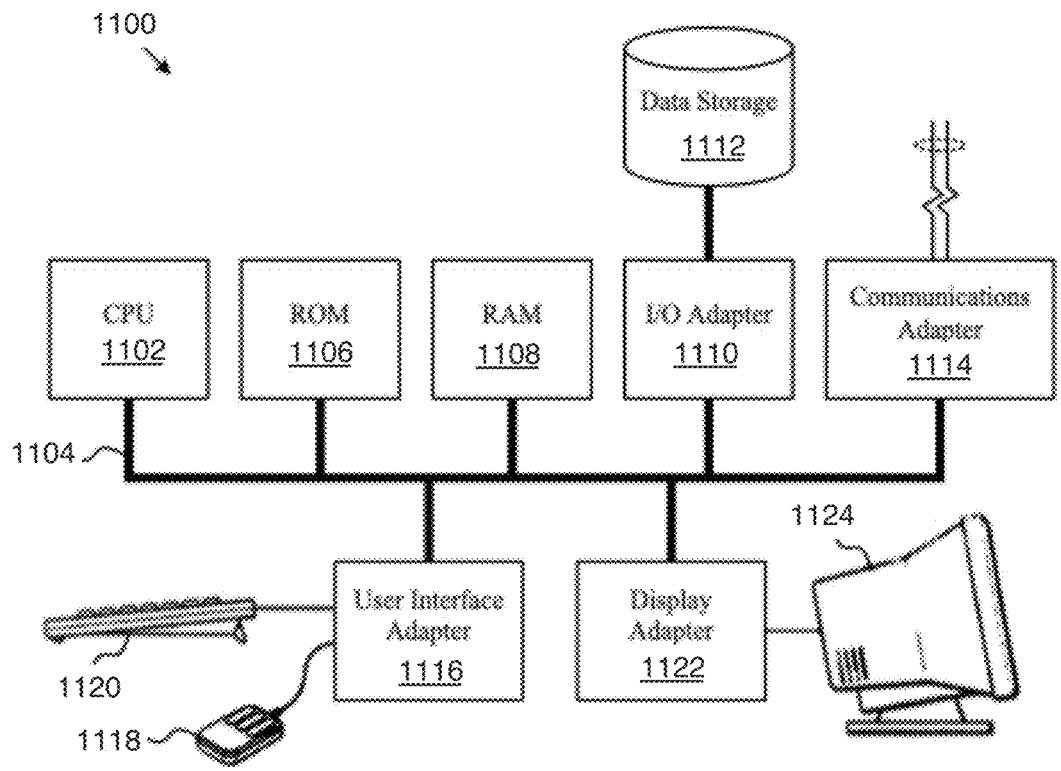
FIG. 11 illustrates a computer system 1100 adapted according to certain embodiments of the alarm detection device and/or the cellular interface device.

FIG. 11 illustrates a computer system 1100 adapted according to certain embodiments of the alarm detection device and/or the cellular interface device. The central processing unit ("CPU") 1102 is coupled to the system bus 1104. The CPU 1102 may be a general purpose CPU or microprocessor, graphics processing unit ("GPU"), and/or microcontroller. The present embodiments are not restricted by the architecture of the CPU 802 so long as the CPU 1102, whether directly or indirectly, supports the operations as described herein. The CPU 1102 may execute the various logical instructions according to the present embodiments.

The computer system 1100 also may include random access memory (RAM) 1108, which may be synchronous RAM (SRAM), dynamic RAM (DRAM), synchronous dynamic RAM (SDRAM), or the like. The computer system 800 may utilize RAM 808 to store the various data structures used by a software application. The computer system 800 also may include read only memory (ROM) 1106 which may be PROM, EPROM, EEPROM, optical storage, or the like. The ROM may store configuration information for booting the computer system 1100. The RAM 808 and the ROM 1106 hold user and system data, and both the RAM 1108 and the ROM 1106 may be randomly accessed.

The computer system 1100 also may include an input/output (I/O) adapter 1110, a communications adapter 1114, a user interface adapter 1116, and a display adapter 1122. The I/O adapter 1110 and/or the user interface adapter 1116 may, in certain embodiments, enable a user to interact with the computer system 1100. In a further embodiment, the display adapter 1122 may display a graphical user interface (GUI) associated with a software- or web-based application on a display device 1124, such as a monitor or touch screen.

The I/O adapter 1110 may couple one or more storage devices 1112, such as one or more of a hard drive, a solid state storage device, a flash drive, a compact disc (CD) drive, a floppy disk drive, and a tape drive, to the computer system 800. According to one embodiment, the data storage 112 may be a separate server coupled to the computer system 1100 through a network connection to the I/O adapter 1110. The communications adapter 1114 may be adapted to couple the computer system 1100 to the network 1158, which may be one or more of a LAN, WAN, and/or the Internet. The communications adapter 1114 also may be adapted to couple the computer system 1100 to other networks such as a global positioning system (GPS) or a Bluetooth network. The user interface adapter 1116 couples user input devices, such as a keyboard 1120, a pointing device 1118, and/or a touch screen (not shown) to the computer system 1100. The keyboard 1120 may be an on-screen keyboard displayed on a touch panel. Additional devices (not shown) such as a camera, microphone, video camera, accelerometer, compass, and or gyroscope may be coupled to the user interface adapter 1116. The display adapter 1122 may be driven by the CPU 1102 to control the display on the display device 1124. Any of the devices 1102-1122 may be physical and/or logical.

The applications of the present disclosure are not limited to the architecture of the computer system 1100. Rather the computer system 1100 is provided as an example of one type of computing device that may be adapted to perform the functions of the alarm device. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, state machine digital logic-based circuitry, or other circuitry.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules. As such, persons of ordinary skill in the art may utilize any number of suitable electronic devices and similar structures capable of executing a sequence of logical operations according to the described embodiments. For example, the computer system 800 may be virtualized for access by multiple users and/or applications.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. An article of manufacture providing a lumber supply theft deterrent device, the lumber supply theft deterrent device comprises:
    a plurality of strap elements coupled together forming a securing loop, the plurality of strap elements being coupled together using one or more coupling devices, the securing loop may be placed around a stack of lumber;
    wherein a first toothed coupling device in a first strap element includes a plurality of male teeth and wherein a second strap element includes a plurality of mating holes, the plurality of male teeth sized and placed to engage an equal number of the plurality of mating holes to secure the first and the second strap element together when the securing loop is tight about the stack of lumber;
    a locking coupling device connecting two of the strap elements together to form a tight fit about the lumber by the securing loop; and
    a locking device for securing the locking coupling device from being opened.

2. The lumber supply theft deterrent device according to claim 1, wherein the securing loop is arranged into a shape of a square or a rectangle in which the plurality of strap elements couple together to form the outer edge of the square or the rectangle when around the stack of lumber.

3. The lumber supply theft deterrent device according to claim 1, wherein the securing loop is arranged into a shape of a square or a rectangle in which the plurality of strap elements couple together to form the outer edge of the rectangle or the square when around the stack of lumber.

4. The lumber supply theft deterrent device according to claim 3, wherein the plurality of strap elements are configured to have adjustable lengths when coupled together to form the outer edge of the rectangle or the square around the stack of lumber.

5. The lumber supply theft deterrent device according to claim 1, wherein the number of mating holes is greater than the number of male teeth such that the plurality of male teeth engage a subset of a consecutive set of mating holes.

6. The lumber supply theft deterrent device according to claim 5, wherein a location of the subset of consecutive set of mating holes used to engage the plurality of male teeth adjusts the length of the securing loop.

7. The lumber supply theft deterrent device according to claim 1, wherein the locking coupling device comprises a threaded bolt and a square connecting tab on each end of a pair of strap elements, wherein the threaded bolt engages a threaded hole within each of the square connecting tabs to couple the pair of strap elements together.

8. The lumber supply theft deterrent device according to claim 7, wherein the threaded bolt accepts a shackle of the locking device for securing the lock to the threaded bolt, the shackle is configured to prevent the threaded bolt from rotating when the locking device is installed in the threaded bolt.

9. The lumber supply theft deterrent device according to claim 8, wherein the threaded bolt is positioned adjacent to the surface of the square connecting tabs coupled to a strap element, the threaded bolt has a locking hole to accept the shackle of the locking device in which the shackle cannot pass between the threaded bolt and the strap element thereby preventing the threaded bolt from rotating.

* * * * *